Figure 1:
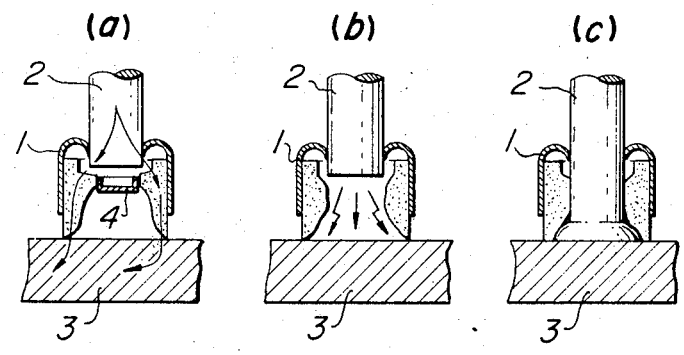

United States Patent [19]
> Yoshida

[11] 3,718,801
[45] Feb. 27, 1973

[54] ARC STARTING STUD WELDING METHOD
[75] Inventor: Hideyuki Yoshida, Amagasaki, Japan
[73] Assignee: Matsushita Electric Industrial Co., Ltd., Osaka, Japan
[22] Filed: April 12, 1971
[21] Appl. No.: 133,010

[30] Foreign Application Priority Data

April 17, 1970 Japan...............................45/33231

[52] U.S. Cl.....................................................219/99
[51] Int. Cl. ..............................................B23k 9/20
[58] Field of Search........................................219/99

[56] References Cited

UNITED STATES PATENTS 2,829,235   4/1958   Van Den Blink.......................219/99

Primary Examiner—R. F. Staubly
Attorney—Stevens, Davis, Miller & Mosher

[57] ABSTRACT

An arc stud welding method providing a metal piece between a stud and a base metal for generating an arc and for deoxidation so as to improve the arc generation effect while protecting the arc from the atmosphere whereby the characteristics of the welded metal is improved. Further, using said metal piece the length of the arc can be maintained as constant so that the uniformity of the stud welding is improved.

1 Claim, 8 Drawing Figures

PATENTED FEB 27 1973  3,718,801

H. YOSHIDA
INVENTOR

BY Stevens, Davis, Miller & Mosher
ATTORNEY

ARC STARTING STUD WELDING METHOD

The present invention relates to an arc stud welding method, and more particularly to an improvement in an arc starting condition of the arc stud welding method.

Generally, two methods of arc stud welding were hitherto available, the Philips method and the Nelson method.

In the Philips method, for example the arc is started by use of a cartridge, and thus the arc starting may be delayed according to the way the cartridge is manufactured. Accordingly, this Philips method has certain disadvantages, such as a low welding speed. The reason for this is that, since a time for warming the cartridge is necessary, a time lag between impressing the voltage between the stud and the base metal and striking the arc cannot be eliminated. This disadvantage may be negligible for studs of small size, such as up to about 16 mm in diameter. However, in a stud having a large diameter, such as 19 mm or 22 mm, a longer time is required before the arc is generated. The arcing time is of the order of 1 second. The length of ignition time (2 seconds at the minimum and 5 seconds at the maximum), accordingly, effects the workability of this method to a large extent.

According to the present invention, the time required for starting the arc is eliminated by triggering it with the aid of a metal piece of aluminum foil which may be used to aid deoxidation of the cartridge.

Thus, the present invention provides an arc stud welding method in which the arc stud welding is performed by sealing a metal piece in the cartridge which contacts the base metal simultaneously as it makes its contact with the stud to be welded in performing the arc stud welding by using a cartridge.

Figure 2:
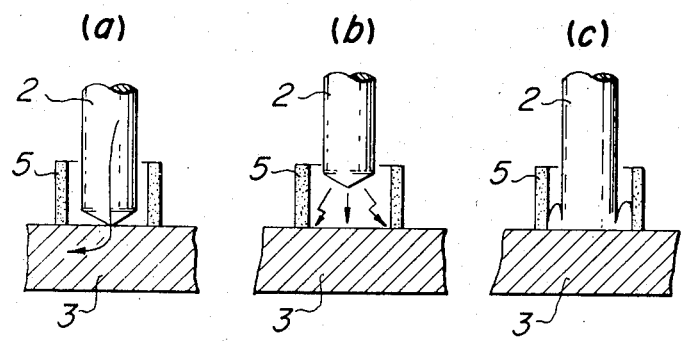
Figure 3:
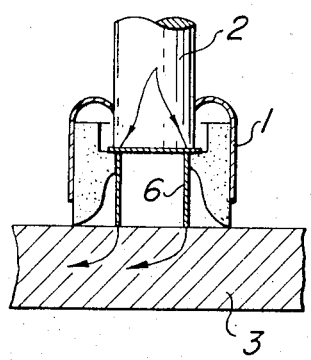
Figure 4:
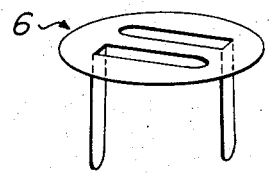

Other objects and advantages of the present invention will be apparent from the following detailed description taken in conjunction with the accompanying drawings, in which:

FIGS. 1a, 1b and 1c illustrate an arrangement required for an arc stud welding at the time of starting the arc, the condition during the arcing, and the condition as the welding is finished respectively of the conventional Philips method, FIGS. 2a, 2b and 2c illustrate the similar three conditions of the conventional Nelson arc stud welding method, FIG. 3 is a diagram illustrating the arc stud welding method of the present invention, and FIG. 4 is an oblique view of the metal piece used in performing the welding method of the present invention.

According to the Philips method, as shown in FIGS. 1a, 1b and 1c, a semiconductor flux 1 forms the cartridge which is used as an auxiliary ring for welding; this cartridge is fitted on the tip of a stud 2, and as the voltage is impressed with the cartridge abutted onto the base metal 3, an electric current flows; then, the cartridge 1 is heated to red-hot, and electrons are discharged in the internal space of the cartridge, thereby striking an arc. After the arc has been struck, the arcing time is determined by a timer or the cartridge itself.

FIG. 1a is a schematic sketch of the arrangement required for arc stud welding at the time of starting arc; FIG. 1b shows the condition during the arcing; and FIG. 1c when the welding is finished. The reference numeral 4 denotes an aluminum foil which is used as the metal piece.

According to the Nelson method, FIGS. 2a, 2b and 2c may be referred to, in which the tip of the stud 2 is formed in a conical shape as shown in FIGS. 2a and 2b, and the deoxidizer of aluminum is applied on the conical surface by spraying it after being melted.

As the stud 2 directly touches the base metal 3, and the voltage is impressed, the electric current is concentrated on the tip of the stud 2; thereby instantaneously melting the tip only. This leads to an ignition. Due to this current, the welding gun is operated to pull up the stud for a predetermined distance. In this instance, the arc is kept formed for a preset time and the length of the arc is maintained constant. This arc is maintained till the welding current is interrupted. In the accompanying drawings, the conditions of welding are schematically shown at the time of starting the arc in FIG. 2a, during the arcing in FIG. 2b, and when the welding is finished in FIG. 2c. The reference numeral 5 represents a ferrule. As described above, the aforementioned two conventional methods basically differ in the method of arc-starting.

An embodiment of the present invention is shown in FIGS. 3 and 4. Aluminum foil 6 such as shown in FIG. 4 is fitted in a cartridge 1 in such a way that they abut the tip of the stud. Then, the stud 2 is fitted in the cartridge 1. Then, this combined stud, cartridge and foil are pushed onto a base metal 3, and a gun is triggered for applying the voltage. Thus, the electric current runs through the stud 2, the aluminum foil 6 and the base metal 3, bypassing the cartridge 1. The stud 2 and the base metal 3 may work as if short-circuited by the aluminum foil 6. The aluminum foil 6, because of having a small heat capacity, is melted instantaneously which leads to the starting of arc between the stud 2 and the base metal 3. Accordingly, the action of arc-striking does not depend on the cartridge 1.

The arc stud welding method of the present invention affords highly excellent arc stud welding, involving no problem in its workability. Accordingly, the method of the present invention described above has great industrial value.

It will be understood that many modifications and variations may be made without departing from the scope of the novel concepts of the present invention.

What is claimed is:

1. An arc stud welding method for welding a stud to a base metal, comprising the steps of: placing a metal foil sealed in an annular, electric conductive slag-forming cartridge, said foil being in the form of a disc engageable by the stud end and having struck-out low heat capacity fingers engageable with the base metal; heating said metal foil with an electric current to substantially instantaneously melt said metal foil, thereby breaking the electrical flow path through said metal foil; and generating an electric arc across the break in said foil to weld said stud and base metal together.

* * * * *